US009540555B2

(12) United States Patent
Minor (10) Patent No.: US 9,540,555 B2
(45) Date of Patent: Jan. 10, 2017

(54) REFRIGERANT MIXTURES COMPRISING TETRAFLUOROPROPENES AND DIFLUOROMETHANE AND USES THEREOF

(71) Applicant: Barbara Haviland Minor, Elkton, MD (US)

(72) Inventor: Barbara Haviland Minor, Elkton, MD (US)

(73) Assignee: THE CHEMOURS COMPANY FC, LLC, Wilmington, DE (US)

(*) Notice: Subject to any disclaimer, the term of this patent is extended or adjusted under 35 U.S.C. 154(b) by 10 days.

(21) Appl. No.: 14/415,633

(22) PCT Filed: Aug. 23, 2013

(86) PCT No.: PCT/US2013/056372
§ 371 (c)(1),
(2) Date: Jan. 19, 2015

(87) PCT Pub. No.: WO2014/031949
PCT Pub. Date: Feb. 27, 2014

(65) Prior Publication Data
US 2015/0225632 A1 Aug. 13, 2015

Related U.S. Application Data

(60) Provisional application No. 61/692,317, filed on Aug. 23, 2012.

(51) Int. Cl.
C09K 5/04 (2006.01)
F25B 9/00 (2006.01)
F25B 45/00 (2006.01)

(52) U.S. Cl.
CPC .............. *C09K 5/045* (2013.01); *F25B 9/006* (2013.01); *F25B 45/00* (2013.01);
(Continued)

(58) Field of Classification Search
CPC .............. C09K 5/045; C09K 2205/126; C09K 2205/22
See application file for complete search history.

(56) References Cited

U.S. PATENT DOCUMENTS

2004/0089839 A1 5/2004 Thomas et al.
2004/0256594 A1 12/2004 Singh et al.
(Continued)

FOREIGN PATENT DOCUMENTS

EP 2 149 592 A2 2/2010
JP 2012-251767 A 12/2012
(Continued)

OTHER PUBLICATIONS

PCT International Search Report and Written Opinion mailed Nov. 21, 2013.
(Continued)

*Primary Examiner* — John Hardee
(74) *Attorney, Agent, or Firm* — N. Lynn Tucker (57) ABSTRACT

In accordance with the present invention compositions are disclosed. The compositions consist of (A) a refrigerant component consisting essentially of (1) at least one refrigerant having an OEL less than 400; and (2) a combination of refrigerants, each having an OEL greater than 400, consisting essentially of (i) HFC-32; and (ii) trans-HFO-1234ze; and optionally (B) a non-refrigerant component; wherein component (A)(2) of the refrigerant component is present in an amount sufficient to provide an overall OEL for the refrigerant component of at least 400. The refrigerant mixtures of the refrigerant component are useful as components in compositions also containing non-refrigerant components (e.g. lubricants), in processes to produce refrigeration, in methods for replacing refrigerant R-410A, and in air conditioning and heat pump apparatus.

11 Claims, 1 Drawing Sheet

(52) U.S. Cl.
CPC .. *C09K 2205/126* (2013.01); *C09K 2205/128* (2013.01); *C09K 2205/22* (2013.01); *C09K 2205/40* (2013.01); *F25B 2400/18* (2013.01)

(56) References Cited

U.S. PATENT DOCUMENTS

| | | |
|---|---|---|
| 2006/0106263 A1 | 5/2006 | Miller et al. |
| 2007/0007488 A1 | 1/2007 | Singh et al. |
| 2007/0284555 A1 | 12/2007 | Leck et al. |
| 2008/0230738 A1 | 9/2008 | Minor et al. |
| 2008/0314073 A1* | 12/2008 | Minor .................. C09K 5/045 62/498 |
| 2009/0278075 A1 | 11/2009 | Mahler et al. |
| 2010/0122545 A1 | 5/2010 | Minor et al. |
| 2012/0097885 A9 | 4/2012 | Hulse et al. |
| 2012/0119136 A1 | 5/2012 | Motta et al. |
| 2012/0144857 A1 | 6/2012 | Rached |
| 2012/0151959 A1 | 6/2012 | Rached |
| 2012/0153213 A1 | 6/2012 | Rached |
| 2013/0020528 A1 | 1/2013 | Yana Motta et al. |
| 2013/0152613 A1 | 6/2013 | Yamashita |

FOREIGN PATENT DOCUMENTS

| | | |
|---|---|---|
| WO | 2009/150763 A1 | 12/2009 |
| WO | 2010/002016 A1 | 1/2010 |
| WO | 2011/023923 A1 | 3/2011 |
| WO | 2011/084813 A1 | 7/2011 |
| WO | 2011/093521 A1 | 8/2011 |
| WO | 2011/141656 A2 | 11/2011 |
| WO | 2012/065026 A2 | 5/2012 |
| WO | 2012/074121 A1 | 6/2012 |

OTHER PUBLICATIONS

ASHRAE Standard 34-201, Designation and Safety Classification of Refrigerants, 2010, American Society of Heating, Refrigerating and Air-Conditioning Engineers, Inc.

* cited by examiner

REFRIGERANT MIXTURES COMPRISING TETRAFLUOROPROPENES AND DIFLUOROMETHANE AND USES THEREOF

BACKGROUND

1. Field of the Disclosure

The present disclosure relates to compositions for use in refrigeration systems wherein the composition comprises tetrafluoropropenes and difluoromethane. The compositions of the present invention are useful in methods for producing cooling, methods for replacing refrigerants and air conditioning and heat pump apparatus.

2. Description of Related Art

The refrigeration industry has been working for the past few decades to find replacement refrigerants for the ozone-depleting chlorofluorocarbons (CFCs) and hydrochlorofluorocarbons (HCFCs) being phased out as a result of the Montreal Protocol. The solution for most refrigerant producers has been the commercialization of hydrofluorocarbon (HFC) refrigerants. The new HFC refrigerants, HFC-134a being the most widely used at this time, have zero ozone depletion potential and thus are not affected by the current regulatory phase out as a result of the Montreal Protocol.

Further environmental regulations may ultimately cause global phase out of certain HFC refrigerants. Currently, industry is facing regulations relating to global warming potential (GWP) for refrigerants used in mobile air-conditioning. Should the regulations be more broadly applied in the future, for instance for stationary air conditioning and refrigeration systems, an even greater need will be felt for refrigerants that can be used in all areas of the refrigeration and air-conditioning industry. Uncertainty as to the ultimate regulatory requirements relative to GWP, have forced the industry to consider multiple candidate compounds and mixtures.

Previously proposed replacement refrigerants for HFC refrigerants and refrigerant blends include HFC-152a, pure hydrocarbons, such as butane or propane, or "natural" refrigerants such as $CO_2$. Each of these suggested replacements has problems including toxicity, flammability, low energy efficiency, or requires major equipment design modifications. New replacements are also being proposed for HCFC-22, R-134a, R-404A, R-507A, R-407C and R-410A, among others.

Uncertainty as to what regulatory requirements relative to GWP will ultimately be adopted have forced the industry to consider multiple candidate compounds and mixtures that balance the need for low GWP, an occupational exposure limit (OEL) greater than 400 ppm, and existing system performance parameters.

In particular, there is a need for refrigerants with OEL greater than 400 ppm, both as formulated and after a leak.

BRIEF SUMMARY

Certain compositions comprising tetrafluoropropenes and difluoromethane have been found to possess suitable properties to allow their use as replacements of higher GWP refrigerants currently in use, in particular R410A. In particular, the present invention has identified refrigerants with OEL greater than 400 ppm, both as formulated and after a leak.

In accordance with the present invention compositions are disclosed. The compositions consist of (A) a refrigerant component consisting essentially of (1) at least one refrigerant having an OEL less than 400; and (2) a combination of refrigerants, each having an OEL greater than 400, consisting essentially of (i) HFC-32; and (ii) trans-HFO-1234ze; and optionally (B) a non-refrigerant component; wherein component (A)(2) of the refrigerant component is present in an amount sufficient to provide an overall OEL for the refrigerant component of at least 400.

The refrigerant mixtures of the refrigerant component are useful as components in compositions also containing non-refrigerant components (e.g. lubricants), in processes to produce refrigeration, in methods for replacing refrigerant R-410A, and in air conditioning and heat pump apparatus.

DETAILED DESCRIPTION

Before addressing details of embodiments described below, some terms are defined or clarified.

DEFINITIONS

As used herein, the term heat transfer fluid means a composition used to carry heat from a heat source to a heat sink.

A heat source is defined as any space, location, object or body from which it is desirable to add, transfer, move or remove heat. Examples of heat sources are spaces (open or enclosed) requiring refrigeration or cooling, such as refrigerator or freezer cases in a supermarket, building spaces requiring air conditioning, industrial water chillers or the passenger compartment of an automobile requiring air conditioning. In some embodiments, the heat transfer composition may remain in a constant state throughout the transfer process (i.e., not evaporate or condense). In other embodiments, evaporative cooling processes may utilize heat transfer compositions as well.

A heat sink is defined as any space, location, object or body capable of absorbing heat. A vapor compression refrigeration system is one example of such a heat sink.

A refrigerant is defined as a heat transfer fluid that undergoes a phase change from liquid to gas and back again during the cycle used to transfer of heat.

A heat transfer system is the system (or apparatus) used to produce a heating or cooling effect in a particular space. A heat transfer system may be a mobile system or a stationary system.

Examples of heat transfer systems are any type of refrigeration systems and air conditioning systems including, but are not limited to, air conditioners, freezers, refrigerators, heat pumps, water chillers, flooded evaporator chillers, direct expansion chillers, walk-in coolers, mobile refrigerators, mobile air conditioning units, dehumidifiers, and combinations thereof.

As used herein, mobile heat transfer system refers to any refrigeration, air conditioner or heating apparatus incorporated into a transportation unit for the road, rail, sea or air. In addition, mobile refrigeration or air conditioner units, include those apparatus that are independent of any moving carrier and are known as "intermodal" systems. Such intermodal systems include "container" (combined sea/land transport) as well as "swap bodies" (combined road/rail transport).

As used herein, stationary heat transfer systems are systems that are fixed in place during operation. A stationary heat transfer system may be associated within or attached to buildings of any variety or may be stand-alone devices located out of doors, such as a soft drink vending machine. These stationary applications may be stationary air conditioning and heat pumps, including but not limited to chillers, high temperature heat pumps, residential, commercial or industrial air conditioning systems (including residential heat pumps), and including window, ductless, ducted, packaged terminal, and those exterior but connected to the building such as rooftop systems. In stationary refrigeration applications, the disclosed compositions may be useful in equipment including commercial, industrial or residential refrigerators and freezers, ice machines, self-contained coolers and freezers, flooded evaporator chillers, direct expansion chillers, walk-in and reach-in coolers and freezers, and combination systems. In some embodiments, the disclosed compositions may be used in supermarket refrigeration systems. Additionally, stationary applications may utilize a secondary loop system that uses a primary refrigerant to produce cooling in one location that is transferred to a remote location via a secondary heat transfer fluid.

Refrigeration capacity (also referred to as cooling capacity) is a term which defines the change in enthalpy of a refrigerant in an evaporator per pound of refrigerant circulated, or the heat removed by the refrigerant in the evaporator per unit volume of refrigerant vapor exiting the evaporator (volumetric capacity). The refrigeration capacity is a measure of the ability of a refrigerant or heat transfer composition to produce cooling. Therefore, the higher the capacity, the greater the cooling that is produced. Cooling rate refers to the heat removed by the refrigerant in the evaporator per unit time.

Coefficient of performance (COP) is the amount of heat removed divided by the required energy input to operate the cycle. The higher the COP, the higher is the energy efficiency. COP is directly related to the energy efficiency ratio (EER) that is the efficiency rating for refrigeration or air conditioning equipment at a specific set of internal and external temperatures.

The term "subcooling" refers to the reduction of the temperature of a liquid below that liquid's saturation point for a given pressure. The saturation point is the temperature at which the vapor is completely condensed to a liquid, but subcooling continues to cool the liquid to a lower temperature liquid at the given pressure. By cooling a liquid below the saturation temperature (or bubble point temperature), the net refrigeration capacity can be increased. Subcooling thereby improves refrigeration capacity and energy efficiency of a system. Subcool amount is the amount of cooling below the saturation temperature (in degrees).

Superheat is a term that defines how far above its saturation vapor temperature (the temperature at which, if the composition is cooled, the first drop of liquid is formed, also referred to as the "dew point") a vapor composition is heated.

Temperature glide (sometimes referred to simply as "glide") is the absolute value of the difference between the starting and ending temperatures of a phase-change process by a refrigerant within a component of a refrigerant system, exclusive of any subcooling or superheating. This term may be used to describe condensation or evaporation of a near azeotrope or non-azeotropic composition. When referring to the temperature glide of a refrigeration, air conditioning or heat pump system, it is common to provide the average temperature glide being the average of the temperature glide in the evaporator and the temperature glide in the condenser.

By azeotropic composition is meant a constant-boiling mixture of two or more substances that behave as a single substance. One way to characterize an azeotropic composition is that the vapor produced by partial evaporation or distillation of the liquid has the same composition as the liquid from which it is evaporated or distilled, i.e., the mixture distills/refluxes without compositional change. Constant-boiling compositions are characterized as azeotropic because they exhibit either a maximum or minimum boiling point, as compared with that of the non-azeotropic mixture of the same compounds. An azeotropic composition will not fractionate within a refrigeration or air conditioning system during operation. Additionally, an azeotropic composition will not fractionate upon leakage from a refrigeration or air conditioning system.

An azeotrope-like composition (also commonly referred to as a "near-azeotropic composition") is a substantially constant boiling liquid admixture of two or more substances that behaves essentially as a single substance. One way to characterize an azeotrope-like composition is that the vapor produced by partial evaporation or distillation of the liquid has substantially the same composition as the liquid from which it was evaporated or distilled, that is, the admixture distills/refluxes without substantial composition change. Another way to characterize an azeotrope-like composition is that the bubble point vapor pressure and the dew point vapor pressure of the composition at a particular temperature are substantially the same. Herein, a composition is azeotrope-like if, after 50 weight percent of the composition is removed, such as by evaporation or boiling off, the difference in vapor pressure between the original composition and the composition remaining after 50 weight percent of the original composition has been removed is less than about 10 percent.

A non-azeotropic (also referred to as zeotropic) composition is a mixture of two or more substances that behaves as a simple mixture rather than a single substance. One way to characterize a non-azeotropic composition is that the vapor produced by partial evaporation or distillation of the liquid has a substantially different composition as the liquid from which it was evaporated or distilled, that is, the admixture distills/refluxes with substantial composition change. Another way to characterize a non-azeotropic composition is that the bubble point vapor pressure and the dew point vapor pressure of the composition at a particular temperature are substantially different. Herein, a composition is non-azeotropic if, after 50 weight percent of the composition is removed, such as by evaporation or boiling off, the difference in vapor pressure between the original composition and the composition remaining after 50 weight percent of the original composition has been removed is greater than about 10 percent.

As used herein, the term "lubricant" means any material added to a composition or a compressor (and in contact with any heat transfer composition in use within any heat transfer system) that provides lubrication to the compressor to aid in preventing parts from seizing.

As used herein, compatibilizers are compounds which improve solubility of the hydrofluorocarbon of the disclosed compositions in heat transfer system lubricants. In some embodiments, the compatibilizers improve oil return to the compressor. In some embodiments, the composition is used with a system lubricant to reduce oil-rich phase viscosity.

As used herein, oil-return refers to the ability of a heat transfer composition to carry lubricant through a heat transfer system and return it to the compressor. That is, in use, it is not uncommon for some portion of the compressor lubricant to be carried away by the heat transfer composition from the compressor into the other portions of the system. In such systems, if the lubricant is not efficiently returned to the compressor, the compressor will eventually fail due to lack of lubrication.

As used herein, "ultra-violet" dye is defined as a UV fluorescent or phosphorescent composition that absorbs light in the ultra-violet or "near" ultra-violet region of the electromagnetic spectrum. The fluorescence produced by the UV fluorescent dye under illumination by a UV light that emits at least some radiation with a wavelength in the range of from 10 nanometers to about 775 nanometers may be detected.

Flammability is a term used to mean the ability of a composition to ignite and/or propagate a flame. For refrigerants and other heat transfer compositions, the lower flammability limit ("LFL") is the minimum concentration of the heat transfer composition in air that is capable of propagating a flame through a homogeneous mixture of the composition and air under test conditions specified in ASTM (American Society of Testing and Materials) E681-04. The upper flammability limit ("UFL") is the maximum concentration of the heat transfer composition in air that is capable of propagating a flame through a homogeneous mixture of the composition and air under the same test conditions. In order to be classified by ASHRAE (American Society of Heating, Refrigerating and Air-Conditioning Engineers) as non-flammable, a refrigerant must be non-flammable under the conditions of ASTM E681-04 as formulated in the liquid and vapor phase as well as non-flammable in both the liquid and vapor phases that result during leakage scenarios.

ASHRAE also assigns a "lower flammable" rating, Class 2L flammability, to compositions that have a burning velocity lower than 10 cm/sec. Burning velocity can be estimated by comparison to the known burning velocity of R-32 or R-152a.

Global warming potential (GWP) is an index for estimating relative global warming contribution due to atmospheric emission of a kilogram of a particular greenhouse gas compared to emission of a kilogram of carbon dioxide. GWP can be calculated for different time horizons showing the effect of atmospheric lifetime for a given gas. The GWP for the 100 year time horizon is commonly the value referenced. For mixtures, a weighted average can be calculated based on the individual GWPs for each component.

Ozone depletion potential (ODP) is a number that refers to the amount of ozone depletion caused by a substance. The ODP is the ratio of the impact on ozone of a chemical compared to the impact of a similar mass of CFC-11 (fluorotrichloromethane). Thus, the ODP of CFC-11 is defined to be 1.0. Other CFCs and HCFCs have ODPs that range from 0.01 to 1.0. HFCs have zero ODP because they do not contain chlorine.

Occupational exposure limit (OEL) is an upper limit on the acceptable concentration of a substance in workplace air for a particular material or class of materials. The OEL for a substance indicates the acceptable exposure over an 8 hour work day, 5 days a week for a working lifetime without adverse health effects. A refrigerant with an OEL of 400 ppm or greater is classified as a class A refrigerant by ASHRAE indicating a lower degree of toxicity. A refrigerant with an OEL of less than 400 ppm is classified as a class B refrigerant by ASHRAE indicating a higher degree of toxicity. Other industries use different terms including TLV-TWA (Threshold Limit Value-Time Weighted Average), WEEL (Workplace Environmental Exposure Limit) and PEL (Permissible Exposure Limit). The OEL of a mixture is the reciprocal addition of the mole fraction (mf) of each individual component divided by their respective OEL. The equation is:

$$1/(mf_1/OEL_1 + mf_2/OEL_2 + \ldots + mf_n/OEL_n)$$

where $mf_n$ is the mole fraction of component "n" and $OEL_n$ is the OEL of component "n".

In order to be classified by ASHRAE as Class A, lower toxicity rating a refrigerant formulation must have an OEL greater than 400 both as originally formulated and in the event of a leak. Per ASHRAE Standard 34-2010, nominal formulations are developed and then assigned manufacturing tolerances (as exact formulations are not made in commercial practice). The Worst Case Formulation (WCF) is selected to represent the formulation within these tolerances that could be most toxic based on the OELs of the individual components. The changes to the WCF are determined for a vapor leak at several conditions, an example of which is a cylinder 90% full by mass and leak at the bubble point temperature of the WCF+10 degrees C. or −40 degrees C., whichever is higher, per the standard. There are several other scenarios described and the scenario which gives the worst case WCFF is used in the analysis. Vapor leak conditions are continued until the formulation reaches atmospheric pressure, and the Worst Case Fractionated Formulation (WCFF) is determined indicating that residual liquid or vapor composition which is expected to have the lowest OEL. If the OEL is above 400 ppm for the as formulated and for the WCFF composition, then it is considered a Class A lower toxicity refrigerant composition. If the OEL is less than 400 ppm for either the as formulated or for the WCFF composition, then it is considered a Class B higher toxicity refrigerant composition.

As used herein, the terms "comprises," "comprising," "includes," "including," "has," "having" or any other variation thereof, are intended to cover a non-exclusive inclusion. For example, a composition, process, method, article, or apparatus that comprises a list of elements is not necessarily limited to only those elements but may include other elements not expressly listed or inherent to such composition, process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The transitional phrase "consisting of" excludes any element, step, or ingredient not specified. If in the claim such would close the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" is used to define a composition, method or apparatus that includes materials, steps, features, components, or elements, in addition to those literally disclosed provided that these additional included materials, steps, features, components, or elements do materially affect the basic and novel characteristic(s) of the claimed invention. The term 'consisting essentially of' occupies a middle ground between "comprising" and 'consisting of'. Typically, components of the refrigerant mixtures and the refrigerant mixtures themselves can contain minor amounts (e.g., less than about 0.5 weight percent total) of impurities and/or byproducts (e.g., from the manufacture of the refrigerant components or reclamation of the refrigerant components from other systems) which do not materially affect the novel and basic characteristics of the refrigerant mixture. For example, HFC-134a may contain minor amounts of HFC-134 as a byproduct from the manufacture of HFC-134a. Of specific note in connection with this invention is trans-HFO-1234ze, which can be a byproduct of certain processes for producing HFO-1234yf (see e.g., US2009/0278075). However, it is noted that certain embodiments of the present invention by reciting trans-HFO-1234ze as a separate component include trans-HFO-1234ze whether or not its presence materially affects the novel and basic characteristics of the refrigerant mixture (alone or together with other impurities and/or byproducts which by themselves would not materially affect the novel and basic characteristics of the refrigerant mixture).

Where applicants have defined an invention or a portion thereof with an open-ended term such as "comprising," it should be readily understood that (unless otherwise stated) the description should be interpreted to also describe such an invention using the terms "consisting essentially of" or "consisting of."

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the disclosed compositions, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

2,3,3,3-tetrafluoropropene may also be referred to as HFO-1234yf, HFC-1234yf, or R1234yf. HFO-1234yf may be made by methods known in the art, such as by dehydrofluorination 1,1,1,2,3-pentafluoropropane (HFC-245eb) or 1,1,1,2,2-pentafluoropropane (HFC-245cb).

Difluoromethane (HFC-32 or R-32) is commercially available or may be made by methods known in the art, such as by dechlorofluorination of methylene chloride.

1,3,3,3-tetrafluoropropene (trans-HFO-1234ze) may be prepared by dehydrofluorination of a 1,1,1,2,3-pentafluoropropane (HFC-245eb, $CF_3CHFCH_2F$) or 1,1,1,3,3-pentafluoropropane (HFC-245fa, $CF_3CH_2CHF_2$). The dehydrofluorination reaction may take place in the vapor phase in the presence or absence of catalyst, and also in the liquid phase by reaction with caustic, such as NaOH or KOH. These reactions are described in more detail in U.S. Patent Publication No. 2006/0106263, incorporated herein by reference. HFO-1234ze may exist as one of two configurational isomers, cis- or trans- (also referred to as the E- and Z-isomers respectively). Trans-HFO-1234ze is available commercially from certain fluorocarbon manufacturers (e.g., Honeywell International Inc., Morristown, N.J.).

Compositions

Disclosed are compositions consisting of: (A) a refrigerant component consisting essentially of (1) at least one refrigerant having an OEL less than 400; and (2) a combination of refrigerants, each having an OEL greater than 400, consisting essentially of (i) HFC-32; and (ii) trans-HFO-1234ze; and optionally (B) a non-refrigerant component; wherein component (A)(2) of the refrigerant component is present in an amount sufficient to provide an overall OEL for the refrigerant component of at least 400.

In one embodiment, the worst case fractionation formulation (WCFF) of the refrigerant component has an overall OEL of at least 400.

In one embodiment, the refrigerant component has a GWP of less than 600. In another embodiment, the refrigerant component has a GWP of less than 500.

Component (A)(1) is selected from refrigerant compounds with OEL less than 400. Such refrigerant compounds include olefinic refrigerants. Olefinic refrigerants include 1,1,1,2,3-pentafluoropropene (HFO-1225ye) and 2,3,3,3-tetrafluoropropene (HFO-1234yf). In one embodiment, component (A)(1) consists essentially of HFO-1234yf.

In one embodiment, the refrigerant component of the composition is suitable for use as a replacement for R410A and consists essentially of from 3 to 20 weight percent of HFO-1234yf, from 70.5 to 74.5 weight percent of HFC-32, and from 7.5 to about 24.5 weight percent of trans-HFO-1234ze. In another embodiment, the refrigerant component of the composition consists essentially of mixtures of HFO-1234yf, HFC-32, and trans-HFO-1234ze containing from 3 to 8 weight percent, from 3 to 9 weight percent, from 3 to 10 weight percent, from 3 to 13 weight percent, from 3 to 15 weight percent, from 3 to 18 weight percent of HFO-1234yf. Also in another embodiment, the refrigerant component contains from 71 to 74 weight percent, from 71 to 73 weight percent, or from 71 to 72 weight percent of HFC-32. And also in another embodiment, the refrigerant component contains from 8 to 24 weight percent, from 10 to 24 weight percent, from 12 to 24 weight percent, from 14 to 24 weight percent, or from 18 to 24 weight percent of trans-HFO-1234ze.

In one embodiment, the refrigerant component of the composition is suitable for use as a replacement for R410A and consists essentially of from 3 to 20 weight percent of HFO-1234yf, from 68 to 74.5 weight percent of HFC-32, and from 7.5 to about 24.5 weight percent of trans-HFO-1234ze.

In one embodiment, the refrigerant component of the composition consists essentially of from 3 to 12 weight percent of HFO-1234yf, from 70.5 to 74.5 weight percent of HFC-32, and from 15.5 to 24.5 weight percent of trans-HFO-1234ze.

In one embodiment, the refrigerant component of the composition consists essentially of from 3 to 7 weight percent of HFO-1234yf, from 70.5 to 74.5 weight percent of HFC-32, and from 20.5 to 24.5 weight percent of trans-HFO-1234ze.

Figure 1:
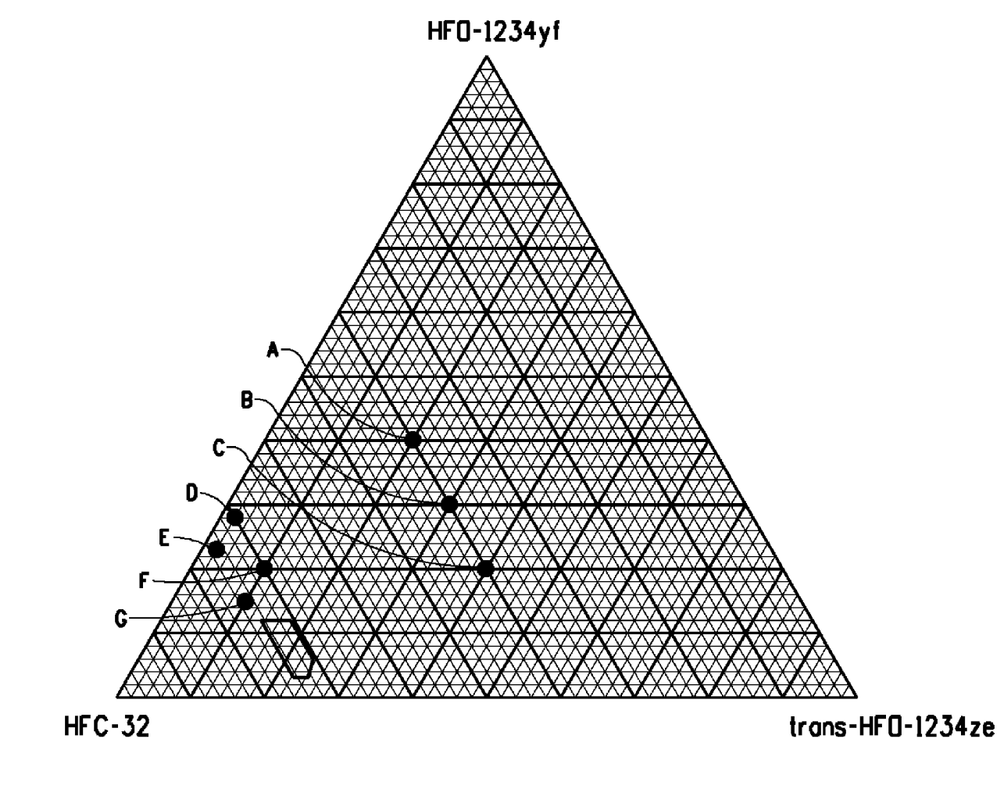
FIG. 1 is a plot of one embodiment of the range of compositions as claimed and specific other known data points. Each apex of the triangle corresponds to 100% of the labeled components, HFO-1234yf, HFC-32 and trans-HFO-1234ze.

FIG. 1 shows that one embodiment of the range of the claimed compositions, from 3 to 12 weight percent HFO-1234yf, from 70.5 to 74.5 weight percent HFC-32, and from 15.5 to 24.5 weight percent trans-HFO-1234ze does not incorporate compositions previously disclosed. The compositions shown by the points in FIG. 1 are:

A 40 wt % HFO1234yf, 40 wt % HFC-32, and 20 wt % trans-HFO-1234ze;

B 30 wt % HFO1234yf, 40 wt % HFC-32, and 30 wt % trans-HFO-1234ze;

C 20 wt % HFO1234yf, 40 wt % HFC-32, and 40 wt % trans-HFO-1234ze;
D 28 wt % HFO1234yf, 70 wt % HFC-32, and 2 wt % trans-HFO-1234ze;
E 23 wt % HFO1234yf, 75 wt % HFC-32, and 2 wt % trans-HFO-1234ze;
F 20 wt % HFO1234yf, 70 wt % HFC-32, and 10 wt % trans-HFO-1234ze; and
G 15 wt % HFO1234yf, 75 wt % HFC-32, and 10 wt % trans-HFO-1234ze.

All of compositions A through G fall outside of the ranges as claimed herein. Additionally, compositions A through G have been found to fractionate in such a manner as to produce compositions with OEL less than 400 (if the HFO-1234yf is set at 100 or lower). Thus, compositions A through G would be classified as Class B refrigerants (higher toxicity) by ASHRAE (per ASHRAE Standard 34-2010), should the OEL for HFO-1234yf be set at 100 or lower.

Compositions of the present invention containing HFO-1234yf, HFC-32 and trans-HFO-1234ze provide nominal compositions, as well as, WCFF compositions with OEL which exceeds 400 ppm indicating Class A lower toxicity per ASHRAE Standard 34-2010. Additionally, these compositions have burning velocities less than 10 cm/sec establishing 2L lower flammability classification according to ASHRAE Standard 34-2010.

In one embodiment, component (A)(1) is selected from refrigerants which have an OEL of about 200 or less. Such refrigerants may include HFO-1225ye and HFO-1234yf. In another embodiment, component (A)(1) is selected from refrigerants which have an OEL of about 100 or less. Such refrigerants may include HFO-1225ye and HFO-1234yf.

HFO-1234yf and mixtures containing HFO-1234yf are being considered as low GWP replacements for certain refrigerants and refrigerant mixtures that have relatively high GWP. In particular, R-410A (ASHRAE designation for a mixture containing 50 wt % HFC-125 and 50 wt % HFC-32) has a GWP of 2088 and will be in need of replacement.

In some embodiments, in addition to the tetrafluoropropenes and difluoromethane, the disclosed compositions may comprise optional non-refrigerant components.

In some embodiments, the optional non-refrigerant components (also referred to herein as additives) in the compositions disclosed herein may comprise one or more components selected from the group consisting of lubricants, dyes (including UV dyes), solubilizing agents, compatibilizers, stabilizers, tracers, perfluoropolyethers, anti-wear agents, extreme pressure agents, corrosion and oxidation inhibitors, metal surface energy reducers, metal surface deactivators, free radical scavengers, foam control agents, viscosity index improvers, pour point depressants, detergents, viscosity adjusters, and mixtures thereof. Indeed, many of these optional non-refrigerant components fit into one or more of these categories and may have qualities that lend themselves to achieve one or more performance characteristic.

In some embodiments, one or more non-refrigerant components are present in small amounts relative to the overall composition. In some embodiments, the amount of additive(s) concentration in the disclosed compositions is from less than about 0.1 weight percent to as much as about 5 weight percent of the total composition. In some embodiments of the present invention, the additives are present in the disclosed compositions in an amount between about 0.1 weight percent to about 5 weight percent of the total composition or in an amount between about 0.1 weight percent to about 3.5 weight percent. The additive component(s) selected for the disclosed composition is selected on the basis of the utility and/or individual equipment components or the system requirements.

In some embodiments, the lubricant is a mineral oil lubricant. In some embodiments, the mineral oil lubricant is selected from the group consisting of paraffins (including straight carbon chain saturated hydrocarbons, branched carbon chain saturated hydrocarbons, and mixtures thereof), naphthenes (including saturated cyclic and ring structures), aromatics (those with unsaturated hydrocarbons containing one or more ring, wherein one or more ring is characterized by alternating carbon-carbon double bonds) and non-hydrocarbons (those molecules containing atoms such as sulfur, nitrogen, oxygen and mixtures thereof), and mixtures and combinations of thereof.

Some embodiments may contain one or more synthetic lubricant. In some embodiments, the synthetic lubricant is selected from the group consisting of alkyl substituted aromatics (such as benzene or naphthalene substituted with linear, branched, or mixtures of linear and branched alkyl groups, often generically referred to as alkylbenzenes), synthetic paraffins and naphthenes, poly(alpha olefins), polyglycols (including polyalkylene glycols), dibasic acid esters, polyesters, polyol esters, neopentyl esters, polyvinyl ethers (PVEs), silicones, silicate esters, fluorinated compounds, phosphate esters, polycarbonates and mixtures thereof, meaning mixtures of the any of the lubricants disclosed in this paragraph.

The lubricants as disclosed herein may be commercially available lubricants. For instance, the lubricant may be paraffinic mineral oil, sold by BVA Oils as BVM 100 N, naphthenic mineral oils sold by Crompton Co. under the trademarks Suniso® 1GS, Suniso® 3GS and Suniso® 5GS, naphthenic mineral oil sold by Pennzoil under the trademark Sontex® 372LT, naphthenic mineral oil sold by Calumet Lubricants under the trademark Calumet® RO-30, linear alkylbenzenes sold by Shrieve Chemicals under the trademarks Zerol® 75, Zerol® 150 and Zerol® 500 and branched alkylbenzene sold by Nippon Oil as HAB 22, polyol esters (POEs) sold under the trademark Castrol® 100 by Castrol, United Kingdom, polyalkylene glycols (PAGs) such as RL-488A from Dow (Dow Chemical, Midland, Mich.), and mixtures thereof, meaning mixtures of any of the lubricants disclosed in this paragraph.

The lubricants used with the present invention may be designed for use with hydrofluorocarbon refrigerants and may be miscible with compositions as disclosed herein under compression refrigeration and air-conditioning apparatus' operating conditions. In some embodiments, the lubricants are selected by considering a given compressor's requirements and the environment to which the lubricant will be exposed.

In the compositions of the present invention including a lubricant, the lubricant is present in an amount of less than 5.0 weight percent to the total composition. In other embodiments, the amount of lubricant is between about 0.1 and 3.5 weight percent of the total composition.

Notwithstanding the above weight ratios for compositions disclosed herein, it is understood that in some heat transfer systems, while the composition is being used, it may acquire additional lubricant from one or more equipment components of such heat transfer system. For example, in some refrigeration, air conditioning and heat pump systems, lubricants may be charged in the compressor and/or the compressor lubricant sump. Such lubricant would be in addition to any lubricant additive present in the refrigerant in such a system. In use, the refrigerant composition when in the compressor may pick up an amount of the equipment lubricant to change the refrigerant-lubricant composition from the starting ratio.

In such heat transfer systems, even when the majority of the lubricant resides within the compressor portion of the system, the entire system may contain a total composition with as much as about 75 weight percent to as little as about 1.0 weight percent of the composition being lubricant. In some systems, for example supermarket refrigerated display cases, the system may contain about 3 weight percent lubricant (over and above any lubricant present in the refrigerant composition prior to charging the system) and 97 weight percent refrigerant.

The non-refrigerant component used with the compositions of the present invention may include at least one dye. The dye may be at least one ultra-violet (UV) dye. The UV dye may be a fluorescent dye. The fluorescent dye may be selected from the group consisting of naphthalimides, perylenes, coumarins, anthracenes, phenanthracenes, xanthenes, thioxanthenes, naphthoxanthenes, fluoresceins, and derivatives of said dye, and combinations thereof, meaning mixtures of any of the foregoing dyes or their derivatives disclosed in this paragraph.

In some embodiments, the disclosed compositions contain from about 0.001 weight percent to about 1.0 weight percent UV dye. In other embodiments, the UV dye is present in an amount of from about 0.005 weight percent to about 0.5 weight percent; and in other embodiments, the UV dye is present in an amount of from 0.01 weight percent to about 0.25 weight percent of the total composition.

UV dye is a useful component for detecting leaks of the composition by permitting one to observe the fluorescence of the dye at or in the vicinity of a leak point in an apparatus (e.g., refrigeration unit, air-conditioner or heat pump). The UV emission, e.g., fluorescence from the dye may be observed under an ultra-violet light. Therefore, if a composition containing such a UV dye is leaking from a given point in an apparatus, the fluorescence can be detected at the leak point, or in the vicinity of the leak point.

Another non-refrigerant component which may be used with the compositions of the present invention may include at least one solubilizing agent selected to improve the solubility of one or more dye in the disclosed compositions. In some embodiments, the weight ratio of dye to solubilizing agent ranges from about 99:1 to about 1:1. The solubilizing agents include at least one compound selected from the group consisting of hydrocarbons, hydrocarbon ethers, polyoxyalkylene glycol ethers (such as dipropylene glycol dimethyl ether), amides, nitriles, ketones, chlorocarbons (such as methylene chloride, trichloroethylene, chloroform, or mixtures thereof), esters, lactones, aromatic ethers, fluoroethers and 1,1,1-trifluoroalkanes and mixtures thereof, meaning mixtures of any of the solubilizing agents disclosed in this paragraph.

In some embodiments, the non-refrigerant component comprises at least one compatibilizer to improve the compatibility of one or more lubricants with the disclosed compositions. The compatibilizer may be selected from the group consisting of hydrocarbons, hydrocarbon ethers, polyoxyalkylene glycol ethers (such as dipropylene glycol dimethyl ether), amides, nitriles, ketones, chlorocarbons (such as methylene chloride, trichloroethylene, chloroform, or mixtures thereof), esters, lactones, aromatic ethers, fluoroethers, 1,1,1-trifluoroalkanes, and mixtures thereof, meaning mixtures of any of the compatibilizers disclosed in this paragraph.

The solubilizing agent and/or compatibilizer may be selected from the group consisting of hydrocarbon ethers consisting of the ethers containing only carbon, hydrogen and oxygen, such as dimethyl ether (DME) and mixtures thereof, meaning mixtures of any of the hydrocarbon ethers disclosed in this paragraph.

The compatibilizer may be linear or cyclic aliphatic or aromatic hydrocarbon compatibilizer containing from 6 to 15 carbon atoms. The compatibilizer may be at least one hydrocarbon, which may be selected from the group consisting of at least hexanes, octanes, nonane, and decanes, among others. Commercially available hydrocarbon compatibilizers include but are not limited to those from Exxon Chemical (USA) sold under the trademarks Isopar® H, a mixture of undecane ($C_{11}$) and dodecane ($C_{12}$) (a high purity $C_{11}$ to $C_{12}$ iso-paraffinic), Aromatic 150 (a $C_9$ to $C_{11}$ aromatic) (Aromatic 200 (a $C_9$ to $C_{15}$ aromatic) and Naptha 140 (a mixture of $C_5$ to $C_{11}$ paraffins, naphthenes and aromatic hydrocarbons) and mixtures thereof, meaning mixtures of any of the hydrocarbons disclosed in this paragraph.

The compatibilizer may alternatively be at least one polymeric compatibilizer. The polymeric compatibilizer may be a random copolymer of fluorinated and non-fluorinated acrylates, wherein the polymer comprises repeating units of at least one monomer represented by the formulae $CH_2$=$C(R^1)CO_2R^2$, $CH_2$=$C(R^3)C_6H_4R^4$, and $CH_2$=$C(R^5)C_6H_4XR^6$, wherein X is oxygen or sulfur; $R^1$, $R^3$, and $R^5$ are independently selected from the group consisting of H and $C_1$-$C_4$ alkyl radicals; and $R^2$, $R^4$, and $R^6$ are independently selected from the group consisting of carbon-chain-based radicals containing C, and F, and may further contain H, Cl, ether oxygen, or sulfur in the form of thioether, sulfoxide, or sulfone groups and mixtures thereof. Examples of such polymeric compatibilizers include those commercially available from E. I. du Pont de Nemours and Company, (Wilmington, Del., 19898, USA) under the trademark Zonyl® PHS. Zonyl® PHS is a random copolymer made by polymerizing 40 weight percent $CH_2$=$C(CH_3)CO_2CH_2CH_2(CF_2CF_2)_mF$ (also referred to as Zonyl® fluoromethacrylate or ZFM) wherein m is from 1 to 12, primarily 2 to 8, and 60 weight percent lauryl methacrylate ($CH_2$=$C(CH_3)CO_2(CH_2)_{11}CH_3$, also referred to as LMA).

In some embodiments, the compatibilizer component contains from about 0.01 to 30 weight percent (based on total amount of compatibilizer) of an additive which reduces the surface energy of metallic copper, aluminum, steel, or other metals and metal alloys thereof found in heat exchangers in a way that reduces the adhesion of lubricants to the metal. Examples of metal surface energy reducing additives include those commercially available from DuPont under the trademarks Zonyl® FSA, Zonyl® FSP, and Zonyl® FSJ.

Another non-refrigerant component which may be used with the compositions of the present invention may be a metal surface deactivator. The metal surface deactivator is selected from the group consisting of areoxalyl bis(benzylidene) hydrazide (CAS reg no. 6629-10-3), N,N'-bis(3,5-di-tert-butyl-4-hydroxyhydrocinnamoylhydrazine (CAS reg no. 32687-78-8), 2,2,'-oxamidobis-ethyl-(3,5-di-tert-butyl-4-hydroxyhydrocinnamate (CAS reg no. 70331-94-1), N,N'-(disalicyclidene)-1,2-diaminopropane (CAS reg no. 94-91-7) and ethylenediaminetetra-acetic acid (CAS reg no. 60-00-4) and its salts, and mixtures thereof, meaning mixtures of any of the metal surface deactivators disclosed in this paragraph.

The non-refrigerant component used with the compositions of the present invention may alternatively be a stabilizer selected from the group consisting of hindered phenols, thiophosphates, butylated triphenylphosphorothionates, organo phosphates, or phosphites, aryl alkyl ethers, terpenes, terpenoids, epoxides, fluorinated epoxides, oxetanes, ascorbic acid, thiols, lactones, thioethers, amines, nitromethane, alkylsilanes, benzophenone derivatives, aryl sulfides, divinyl terephthalic acid, diphenyl terephthalic acid, ionic liquids, and mixtures thereof, meaning mixtures of any of the stabilizers disclosed in this paragraph.

The stabilizer may be selected from the group consisting of tocopherol; hydroquinone; t-butyl hydroquinone; monothiophosphates; and dithiophosphates, commercially available from Ciba Specialty Chemicals, Basel, Switzerland, hereinafter "Ciba", under the trademark Irgalube® 63; dialkylthiophosphate esters, commercially available from Ciba under the trademarks Irgalube® 353 and Irgalube® 350, respectively; butylated triphenylphosphorothionates, commercially available from Ciba under the trademark Irgalube® 232; amine phosphates, commercially available from Ciba under the trademark Irgalube® 349 (Ciba); hindered phosphites, commercially available from Ciba as Irgafos® 168 and Tris-(di-tert-butylphenyl)phosphite, commercially available from Ciba under the trademark Irgafos® OPH; (Di-n-octyl phosphite); and iso-decyl diphenyl phosphite, commercially available from Ciba under the trademark Irgafos® DDPP; trialkyl phosphates, such as trimethyl phosphate, triethylphosphate, tributyl phosphate, trioctyl phosphate, and tri(2-ethylhexyl)phosphate; triaryl phosphates including triphenyl phosphate, tricresyl phosphate, and trixylenyl phosphate; and mixed alkyl-aryl phosphates including isopropylphenyl phosphate (IPPP), and bis(t-butylphenyl)phenyl phosphate (TBPP); butylated triphenyl phosphates, such as those commercially available under the trademark Syn-O-Ad® including Syn-O-Ad® 8784; tert-butylated triphenyl phosphates such as those commercially available under the trademark Durad®620; isopropylated triphenyl phosphates such as those commercially available under the trademarks Durad® 220 and Durad®110; anisole; 1,4-dimethoxybenzene; 1,4-diethoxybenzene; 1,3,5-trimethoxybenzene; myrcene, alloocimene, limonene (in particular, d-limonene); retinal; pinene; menthol; geraniol; farnesol; phytol; Vitamin A; terpinene; delta-3-carene; terpinolene; phellandrene; fenchene; dipentene; caratenoids, such as lycopene, beta carotene, and xanthophylls, such as zeaxanthin; retinoids, such as hepaxanthin and isotretinoin; bornane; 1,2-propylene oxide; 1,2-butylene oxide; n-butyl glycidyl ether; trifluoromethyloxirane; 1,1-bis(trifluoromethyl)oxirane; 3-ethyl-3-hydroxymethyl-oxetane, such as OXT-101 (Toagosei Co., Ltd); 3-ethyl-3-((phenoxy)methyl)-oxetane, such as OXT-211 (Toagosei Co., Ltd); 3-ethyl-3-((2-ethyl-hexyloxy)methyl)-oxetane, such as OXT-212 (Toagosei Co., Ltd); ascorbic acid; methanethiol (methyl mercaptan); ethanethiol (ethyl mercaptan); Coenzyme A; dimercaptosuccinic acid (DMSA); grapefruit mercaptan ((R)-2-(4-methylcyclohex-3-enyl)propane-2-thiol)); cysteine ((R)-2-amino-3-sulfanyl-propanoic acid); lipoamide (1,2-dithiolane-3-pentanamide); 5,7-bis(1,1-dimethylethyl)-3-[2,3(or 3,4)-dimethylphenyl]-2(3H)-benzofuranone, commercially available from Ciba under the trademark Irganox® HP-136; benzyl phenyl sulfide; diphenyl sulfide; diisopropylamine; dioctadecyl 3,3'-thiodipropionate, commercially available from Ciba under the trademark Irganox® PS 802 (Ciba); didodecyl 3,3'-thiopropionate, commercially available from Ciba under the trademark Irganox® PS 800; di-(2,2,6,6-tetramethyl-4-piperidyl)sebacate, commercially available from Ciba under the trademark Tinuvin® 770; poly-(N-hydroxyethyl-2,2,6,6-tetramethyl-4-hydroxy-piperidyl succinate, commercially available from Ciba under the trademark Tinuvin® 622LD (Ciba); methyl bis tallow amine; bis tallow amine; phenol-alpha-naphthylamine; bis(dimethylamino)methylsilane (DMAMS); tris(trimethylsilyl)silane (TTMSS); vinyltriethoxysilane; vinyltrimethoxysilane; 2,5-difluorobenzophenone; 2',5'-dihydroxyacetophenone; 2-aminobenzophenone; 2-chlorobenzophenone; benzyl phenyl sulfide; diphenyl sulfide; dibenzyl sulfide; ionic liquids; and mixtures and combinations thereof.

The additive used with the compositions of the present invention may alternatively be an ionic liquid stabilizer. The ionic liquid stabilizer may be selected from the group consisting of organic salts that are liquid at room temperature (approximately 25° C.), those salts containing cations selected from the group consisting of pyridinium, pyridazinium, pyrimidinium, pyrazinium, imidazolium, pyrazolium, thiazolium, oxazolium and triazolium and mixtures thereof; and anions selected from the group consisting of $[BF_4]-$, $[PF_6]-$, $[SbF_6]-$, $[CF_3SO_3]-$, $[HCF_2CF_2SO_3]-$, $[CF_3HFCCF_2SO_3]-$, $[HCClFCF_2SO_3]-$, $[(CF_3SO_2)_2N]-$, $[(CF_3CF_2SO_2)_2N]-$, $[(CF_3SO_2)_3C]-$, $[CF_3CO_2]-$, and F— and mixtures thereof. In some embodiments, ionic liquid stabilizers are selected from the group consisting of emim $BF_4$ (1-ethyl-3-methylimidazolium tetrafluoroborate); bmim $BF_4$ (1-butyl-3-methylimidazolium tetraborate); emim $PF_6$ (1-ethyl-3-methylimidazolium hexafluorophosphate); and bmim $PF_6$ (1-butyl-3-methylimidazolium hexafluorophosphate), all of which are available from Fluka (Sigma-Aldrich).

In some embodiments, the stabilizer may be a hindered phenol, which is any substituted phenol compound, including phenols comprising one or more substituted or cyclic, straight chain, or branched aliphatic substituent group, such as, alkylated monophenols including 2,6-di-tert-butyl-4-methylphenol; 2,6-di-tert-butyl-4-ethylphenol; 2,4-dimethyl-6-tertbutylphenol; tocopherol; and the like, hydroquinone and alkylated hydroquinones including t-butyl hydroquinone, other derivatives of hydroquinone; and the like, hydroxylated thiodiphenyl ethers, including 4,4'-thiobis(2-methyl-6-tert-butylphenol); 4,4'-thiobis(3-methyl-6-tertbutylphenol); 2,2'-thiobis(4methyl-6-tert-butylphenol); and the like, alkylidene-bisphenols including: 4,4'-methylenebis(2,6-di-tert-butylphenol); 4,4'-bis(2,6-di-tert-butylphenol); derivatives of 2,2'- or 4,4-biphenoldiols; 2,2'-methylenebis(4-ethyl-6-tertbutylphenol); 2,2'-methylenebis(4-methyl-6-tertbutylphenol); 4,4-butylidenebis(3-methyl-6-tert-butylphenol); 4,4-isopropylidenebis(2,6-di-tert-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol, 2,2- or 4,4-biphenyldiols including 2,2'-methylenebis(4-ethyl-6-tert-butylphenol); butylated hydroxytoluene (BHT, or 2,6-di-tert-butyl-4-methylphenol), bisphenols comprising heteroatoms including 2,6-di-tert-alpha-dimethylamino-p-cresol, 4,4-thiobis(6-tert-butyl-m-cresol); and the like; acylaminophenols; 2,6-di-tert-butyl-4(N,N'-dimethylaminomethylphenol); sulfides including; bis(3-methyl-4-hydroxy-5-tert-butylbenzyl)sulfide; bis(3,5-di-tert-butyl-4-hydroxybenzyl) sulfide and mixtures thereof, meaning mixtures of any of the phenols disclosed in this paragraph.

The non-refrigerant component which is used with compositions of the present invention may alternatively be a tracer. The tracer may be two or more tracer compounds from the same class of compounds or from different classes of compounds. In some embodiments, the tracer is present in the compositions at a total concentration of about 50 parts per million by weight (ppm) to about 1000 ppm, based on the weight of the total composition. In other embodiments, the tracer is present at a total concentration of about 50 ppm to about 500 ppm. Alternatively, the tracer is present at a total concentration of about 100 ppm to about 300 ppm.

The tracer may be selected from the group consisting of hydrofluorocarbons (HFCs), deuterated hydrofluorocarbons, perfluorocarbons, fluoroethers, brominated compounds, iodated compounds, alcohols, aldehydes and ketones, nitrous oxide and combinations thereof. Alternatively, the tracer may be selected from the group consisting of fluoroethane, 1,1,-difluoroethane, 1,1,1-trifluoroethane, 1,1,1,3,3,3-hexafluoropropane, 1,1,1,2,3,3,3-heptafluoropropane, 1,1,1,3,3-pentafluoropropane, 1,1,1,3,3-pentafluorobutane, 1,1,1,2,3,4,4,5,5,5-decafluoropentane, 1,1,1,2,2,3,4,5,5,6,6,7,7,7-tridecafluoroheptane, iodotrifluoromethane, deuterated hydrocarbons, deuterated hydrofluorocarbons, perfluorocarbons, fluoroethers, brominated compounds, iodated compounds, alcohols, aldehydes, ketones, nitrous oxide ($N_2O$) and mixtures thereof. In some embodiments, the tracer is a blend containing two or more hydrofluorocarbons, or one hydrofluorocarbon in combination with one or more perfluorocarbons.

The tracer may be added to the compositions of the present invention in predetermined quantities to allow detection of any dilution, contamination or other alteration of the composition.

The additive which may be used with the compositions of the present invention may alternatively be a perfluoropolyether as described in detail in US2007-0284555, incorporated herein by reference.

It will be recognized that certain of the additives referenced above as suitable for the non-refrigerant component have been identified as potential refrigerants. However in accordance with this invention, when these additives are used, they are not present at an amount that would affect the novel and basic characteristics of the refrigerant mixtures of this invention. Preferably, the refrigerant mixtures and the compositions of this invention containing them, contain no more than about 0.5 weight percent of the refrigerants other than HFO-1234yf, HFC-32 and trans-HFO-1234ze.

In one embodiment, the compositions disclosed herein may be prepared by any convenient method to combine the desired amounts of the individual components. A preferred method is to weigh the desired component amounts and thereafter combine the components in an appropriate vessel. Agitation may be used, if desired.

Compositions of the present invention have zero ozone depletion potential and low global warming potential (GWP). Additionally, the compositions of the present invention will have global warming potentials that are less than many hydrofluorocarbon refrigerants currently in use. One aspect of the present invention is to provide a refrigerant with a global warming potential of less than 1000, less than 600, less than 500, less than 400, less than 300, less than 150, less than 100, or less than 50.

Apparatus, Methods and Processes of Use

The compositions disclosed herein are useful as heat transfer compositions or refrigerants. In particular, the compositions comprising HFO-1234yf, HFC-32 and HFO-1234ze are useful as refrigerants. Also, the compositions comprising HFO-1234yf, HFC-32 and HFO-1234ze are useful as replacements for R410A in air conditioning systems and heat pump systems.

Vapor-compression air conditioning and heat pump systems include an evaporator, a compressor, a condenser, and an expansion device. A refrigeration cycle re-uses refrigerant in multiple steps producing a cooling effect in one step and a heating effect in a different step. The cycle can be described simply as follows. Liquid refrigerant enters an evaporator through an expansion device, and the liquid refrigerant boils in the evaporator, by withdrawing heat from the environment, at a low temperature to form a gas and produce cooling. Often air or a heat transfer fluid flows over or around the evaporator to transfer the cooling effect caused by the evaporation of the refrigerant in the evaporator to a body to be cooled. The low-pressure gas enters a compressor where the gas is compressed to raise its pressure and temperature. The higher-pressure (compressed) gaseous refrigerant then enters the condenser in which the refrigerant condenses and discharges its heat to the environment. The refrigerant returns to the expansion device through which the liquid expands from the higher-pressure level in the condenser to the low-pressure level in the evaporator, thus repeating the cycle.

A method is provided for replacing R410A in air conditioning and heat pump equipment including an evaporator designed for a refrigerant evaporation temperature between about −5° C. and about 20° C. The method comprises replacing said R410A with a refrigerant of the present invention consisting of HFO-1234yf, HFC-32 and trans-HFO-1234ze.

In one embodiment, a method for producing cooling in air conditioning or heat pump equipment suitable for using R410A as a refrigerant is provided. The method comprises producing cooling in said equipment using a refrigerant of the present invention consisting of HFO-1234yf, HFC-32 and trans-HFO-1234ze as refrigerant.

In one embodiment, a method for producing heating in heat pump equipment suitable for using R410A as a refrigerant is provided. The method comprises producing heating in said equipment using a refrigerant of the present invention consisting of HFO-1234yf, HFC-32 and trans-HFO-1234ze as refrigerant.

In one embodiment, an air conditioning or heat pump apparatus containing a refrigerant composition and suitable for using a refrigerant composition wherein R410A is the refrigerant component of said refrigerant composition is provided. The apparatus is characterized by: containing the refrigerant composition of the present invention consisting of HFO-1234yf, HFC-32 and trans-HFO-1234ze.

In another embodiment, an air conditioning or heat pump apparatus containing a refrigerant composition and including an evaporator designed for a refrigerant evaporation temperature between about −5° C. and about 20° C. is provided. The apparatus is characterized by: containing the refrigerant composition of the present invention consisting of HFO-1234yf, HFC-32 and trans-HFO-1234ze.

In one embodiment, disclosed herein is a process for producing cooling comprising condensing a refrigerant component of a composition as disclosed herein containing HFO-1234yf, HFC-32 and trans-HFO-1234ze and thereafter evaporating said refrigerant component in the vicinity of a body to be cooled. In another embodiment, the cooling takes place in air conditioning or heat pump equipment suitable for using R410A as refrigerant.

A body to be cooled may be defined as any space, location, object or body for which it is desirable to provide cooling. Examples include spaces (open or enclosed) requiring air conditioning or cooling, such as single family homes, town houses or multiple apartment buildings or public buildings.

In another embodiment, disclosed herein is a process for producing heating comprising evaporating a refrigerant component of a composition as disclosed herein containing HFO-1234yf, HFC-32 and trans-HFO-1234ze and thereafter condensing said refrigerant component in the vicinity of a body to be heated. In another embodiment, the heating takes place in heat pump equipment suitable for using R410A as refrigerant.

A body to be heated may be defined as any space, location, object or body for which it is desirable to provide heat. Examples include spaces (open or enclosed) requiring heating, such as such as single family homes, town houses or multiple apartment buildings or public buildings By vicinity is meant that the evaporator of the system containing the refrigerant mixture is located either within or adjacent to the body to be cooled or heated, such that air moving over the evaporator would move into or around the body to be cooled or heated.

In some embodiments, the refrigerant mixtures as disclosed herein may be useful in particular in air conditioning and heat pump applications including self-contained window air conditioners, packaged terminal air conditioners (PTACs), non-ducted or duct-free mini-split or multi-split air conditioners or heat pumps, ducted residential and commercial systems, and packaged air conditioners or heat pumps, such as rooftop units. Additionally, in some embodiments, the disclosed compositions may function as primary refrigerants in secondary loop systems that provide cooling or heating to remote locations by use of a secondary heat transfer fluid, which may comprise water, a glycol, carbon dioxide, or a fluorinated hydrocarbon fluid. In this case the secondary heat transfer fluid is the body to be cooled or heated as it is adjacent to the evaporator and is cooled or heated before moving to a remote body to be cooled or heated.

The compositions disclosed herein may be useful as low GWP (global warming potential) replacements for currently used refrigerants, including R410A (ASHRAE designation for a blend of 50 weight percent R125 and 50 weight percent R32).

Often replacement refrigerants are most useful if capable of being used in the original refrigeration equipment designed for a different refrigerant. Additionally, the compositions as disclosed herein may be useful as replacements for R410A in equipment designed for R410A with some system modifications. Further, the compositions as disclosed herein comprising HFO-1234yf, HFC-32 and trans-HFO-1234ze may be useful for replacing R410A in equipment specifically modified for or produced entirely for these new compositions comprising HFO-1234yf, HFC-32 and trans-HFO-1234ze.

In many applications, some embodiments of the disclosed compositions are useful as refrigerants and provide at least comparable cooling performance (meaning cooling capacity and energy efficiency) as the refrigerant for which a replacement is being sought.

In another embodiment is provided a method for replacing a refrigerant selected from the group consisting of R410A. The method comprises charging an air conditioning or heat pump apparatus with a refrigerant mixture comprising HFO-1234yf, HFC-32, and trans-HFO-1234ze as described herein. In one embodiment the refrigeration apparatus is suitable for use with R410A. In another embodiment the refrigeration apparatus includes systems with evaporating temperatures in the range of from about −5° C. and about 20° C. Of note are embodiments wherein the refrigeration apparatus includes systems with evaporating temperatures in the range of from about 0° C. to about 10° C.

In another embodiment is provided a method for recharging a heat transfer system that contains a refrigerant to be replaced and a lubricant, said method comprising removing the refrigerant to be replaced from the heat transfer system while retaining a substantial portion of the lubricant in said system and introducing one of the compositions herein disclosed containing HFO-1234yf, HFC-32 and trans-HFO-1234ze to the heat transfer system.

In another embodiment, a heat exchange system comprising a composition disclosed herein is provided, wherein said system is selected from the group consisting of air conditioners, heat pumps, chillers, and systems having combinations thereof.

In one embodiment, there is provided a heat transfer system containing a composition as disclosed herein. In another embodiment is disclosed an air conditioning system or heat pump apparatus containing a composition as disclosed herein. In another embodiment, is disclosed a stationary air conditioning apparatus containing a composition as disclosed herein. In a particular embodiment, is disclosed a stationary heat pump apparatus containing the composition of the present invention. In another particular embodiment, is disclosed a mobile heat pump apparatus containing the composition of the present invention. The apparatus typically includes an evaporator, a compressor, a condenser, and an expansion device.

EXAMPLES

The concepts disclosed herein will be further described in the following examples, which do not limit the scope of the invention described in the claims.

Example 1

Vapor Leakage of HFC-32/HFO-1234yf/HFO-1234ze Compositions

Compositions of the present invention are evaluated under vapor leak conditions as described under ASHRAE Standard 34 "Designation and Safety Classification of Refrigerants" to evaluate scenarios whereby requirements could be met for non-flammability and an Occupational Exposure Limit (OEL) of at least 400 ppm. This would allow an ASHRAE Class A1 non-flammable, lower toxicity rating which is preferred by the HVAC&R industry. Per the standard, nominal formulations are developed and then assigned manufacturing tolerances (as exact formulations are not made in commercial practice). The Worst Case Formulation (WCF) is selected to represent the formulation that could be most flammable and most toxic based on the flammability and OELs of the individual components. The changes to the WCF is determined for vapor leak at worst case conditions, which in the case of the compositions of the present invention is the bubble point of the WCF+10° C. or −40° C. whichever is higher per the standard. Vapor leak conditions are continued until the formulation reaches atmospheric pressure (after about 89-95% leakage), and the Worst Case Fractionated Formulation (WCFF) is determined indicating the residual liquid or vapor composition which is expected to be the most flammable or most toxic. If the OEL is above 400 ppm and the WCFF is expected to be non-flammable, it is considered a preferred mixture. Results are shown in Table 1 below for a range of potential OELs for HFO-1234yf at 50 ppm, 100 ppm, 150 ppm and 200 ppm and compositions are adjusted accordingly to meet Class A1 requirements.

TABLE 1

| | wt % | | | |
|---|---|---|---|---|
| HFO-1234yf | HFC-32 | trans-HFO-1234ze | OEL (ppm) | GWP |
| R410A | | | 1000 | 2088 |
| *If HFO-1234yf OEL = 50* | | | | |
| Nominal 5 | 72.5 | 22.5 | 649 | 491 |
| MFR Tolerance 3-7 | 70.5-74.5 | 20.5-24.5 | | |
| WCF 7 | 70.5 | 22.5 | | |
| WCFF - Final Liquid Comp after 89.4% Leak at Bub Pt + 10 C. = −40 C., 90% Full  7.9 | 15.0 | 77.1 | 410 | |
| *If HFO-1234yf OEL = 100* | | | | |
| Nominal 10 | 72.5 | 17.5 | 664 | 491 |
| MFR Tolerance 8-12 | 70.5-74.5 | 15.5-19.5 | | |
| WCF 12 | 70.5 | 17.5 | | |
| WCFF - Final Liquid Comp after 91.7% Leak at Bub Pt + 10 C. = −40 C., 90% Full  16.3 | 13.9 | 69.8 | 415 | |
| *If HFO-1234yf OEL = 150* | | | | |
| Nominal 14 | 72.5 | 13.5 | 693 | 491 |
| MFR Tolerance 12-16 | 70.5-74.5 | 11.5-15.5 | | |
| WCF 16 | 70.5 | 13.5 | | |
| WCFF - Final Liquid Comp after 93.3% Leak at Bub Pt + 10° C. = −40° C., 90% Full  28.6 | 12.6 | 58.8 | 417 | |
| *If HFO-1234yf OEL = 200* | | | | |
| Nominal 18 | 72.5 | 9.5 | 715 | 491 |
| MFR Tolerance 16-20 | 70.5-74.5 | 7.5-11.5 | | |
| WCF 20 | 70.5 | 8.5 | | |
| WCFF - Final Liquid Comp after 94.7% Leak at Bub Pt + 10° C. = −40° C., 90% Full  39.1 | 11.7 | 49.2 | 403 | |

The data shows that compositions of the present invention containing HFO-1234yf, HFC-32 and trans-HFO-1234ze provide nominal compositions, as well as, WCFF compositions with OEL which exceed 400 ppm indicating Class A lower toxicity per ASHRAE Standard 34-2010. These compositions will also have burning velocity less than 10 cm/sec because each component of the composition has burning velocity less than 10 cm/sec. Thus establishing these compositions as 2L lower flammability classification according to the ASHRAE Standard.

Example 2

Cooling Performance for HFC-32/HFO-1234yf/HFO-1234ze Compositions

Cooling performance for compositions of the present invention is determined and displayed in Table 2 as compared to R-404A; R-507A; R-407F; and R-407A. Compressor discharge temperatures, COP (energy efficiency) and cooling capacity (cap) are calculated from physical property measurements for the following specific conditions (as typical for air conditioning):

| | |
|---|---|
| Evaporator temperature | 4° C. |
| Condenser temperature | 40° C. |
| Subcool amount | 6° K |
| Return gas temperature | 18° C. |
| Compressor efficiency | 70% |

Note that the superheat is included in cooling capacity. GWP has also been calculated based on IPCC AR4 values where available.

TABLE 2

| | Wt % | | | | Disch | | Rel | | COP |
|---|---|---|---|---|---|---|---|---|---|
| | 1234yf | 32 | trans-1234ze | OEL (ppm) | GWP | Temp (C.) | Cap (kJ/m³) | Cap to 410A | COP | Rel to 410A |
| R-410A | | | | 1000 | 2088 | 83 | 5658 | 100% | 4.312 | 100% |
| R-32 | | | | 1000 | 675 | 104 | 6136 | 108% | 4.317 | 100% |
| | 7.5 | 68 | 24.5 | 549 | 461 | 91 | 5268 | 93% | 4.354 | 101% |
| | 5 | 72.5 | 22.5 | 649 | 491 | 93 | 5406 | 96% | 4.352 | 101% |
| | 4 | 74.5 | 21.5 | 699 | 504 | 94 | 5465 | 97% | 4.351 | 101% |
| | 10 | 72.5 | 17.5 | 664 | 491 | 93 | 5461 | 97% | 4.351 | 101% |
| | 14 | 72.5 | 13.5 | 693 | 491 | 92 | 5504 | 97% | 4.349 | 101% |
| | 18 | 72.5 | 9.5 | 715 | 491 | 92 | 5545 | 98% | 4.348 | 101% |

The data in Table 2 indicate compositions of the present invention would serve as good replacements for R-410A. These compositions show cooling capacity within about 4% of R-410A and improved energy efficiency. Also, compressor discharge temperatures are improved versus R-32, thus improving compressor life. The compositions of the present invention also have reduced GWP. Therefore, compositions of the present invention provide the best balance of properties as replacements for R-410A.

Example 3

Comparative Example

Vapor Leakage of Other
HFC-32/HFO-1234yf/HFO-1234ze Compositions

Other compositions containing HFO-1234yf, HFC-32, and trans-HFO-1234ze are evaluated under vapor leak conditions as described above in Examples 1. Vapor leak conditions are continued until the formulation reaches atmospheric pressure (for this example, after about 67-97% leakage), and the Worst Case Fractionated Formulation (WCFF) is determined indicating the residual liquid or vapor composition which is expected to be the most toxic. The OEL for the WCFF is calculated. If it is above 400 ppm, the composition may be classified as a Class A toxicity (lower toxicity) refrigerant by ASHRAE. Results are shown in Table 3 below for OELs for HFO-1234yf at 50 ppm and 100 ppm.

TABLE 3

Case 1

| Initial Composition (A) | | Liquid Composition After 67.1% Leak (WCFF) at −38.9° C. |
|---|---|---|
| Compound | wt % | wt % |
| R32 | 40 | 11.1 |
| 1234yf | 40 | 50.6 |
| trans-1234ze | 20 | 38.3 |

| 1234yf OEL ppm | Blend OEL ppm | WCFF Blend OEL ppm |
|---|---|---|
| 50 | 162 | 104 |
| 100 | 288 | 196 |

Case 2

| Initial Composition (B) | | Liquid Composition After 63.0% Leak (WCFF) at −38.5° C. |
|---|---|---|
| Compound | wt % | wt % |
| R32 | 40 | 12.7 |
| 1234yf | 30 | 34.5 |
| trans-1234ze | 30 | 52.8 |

| 1234yf OEL ppm | Blend OEL ppm | WCFF Blend OEL ppm |
|---|---|---|
| 50 | 204 | 147 |
| 100 | 347 | 262 |

TABLE 3-continued

Case 3

| Initial Composition (C) | | Liquid Composition After 58.4% Leak (WCFF) at −38.1° C. |
|---|---|---|
| Compound | wt % | wt % |
| R32 | 40 | 14.3 |
| 1234yf | 20 | 20.9 |
| trans-1234ze | 40 | 64.8 |

| 1234yf OEL ppm | Blend OEL ppm | WCFF Blend OEL ppm |
|---|---|---|
| 50 | 275 | 221 |
| 100 | 437 | 364 |

Case 4

| Initial Composition (D) | | Liquid Composition After 97.3% Leak (WCFF) at −40° C. |
|---|---|---|
| Compound | wt % | wt % |
| R32 | 70 | 10 |
| 1234yf | 28 | 73.6 |
| trans-1234ze | 2 | 16.4 |

| 1234yf OEL ppm | Blend OEL ppm | WCFF Blend OEL ppm |
|---|---|---|
| 50 | 256 | 74 |
| 100 | 421 | 144 |

Case 5

| Initial Composition (E) | | Liquid Composition After 97.3% Leak (WCFF) at −40° C. |
|---|---|---|
| Compound | wt % | wt % |
| R32 | 75 | 10.9 |
| 1234yf | 23 | 65.9 |
| trans-1234ze | 2 | 23.2 |

| 1234yf OEL ppm | Blend OEL ppm | WCFF Blend OEL ppm |
|---|---|---|
| 50 | 302 | 82 |
| 100 | 477 | 159 |

Case 6

| Initial Composition (F) | | Liquid Composition After 97.3% Leak (WCFF) at −40° C. |
|---|---|---|
| Compound | wt % | wt % |
| R32 | 70 | 15.6 |
| 1234yf | 20 | 33.3 |
| trans-1234ze | 10 | 51.1 |

| 1234yf OEL ppm | Blend OEL ppm | WCFF Blend OEL ppm |
|---|---|---|
| 50 | 324 | 155 |
| 100 | 501 | 275 |

Case 7

| Initial Composition (G) | | Liquid Composition After 97.3% Leak (WCFF) at −40° C. |
|---|---|---|
| Compound | wt % | wt % |
| R32 | 75 | 17.4 |
| 1234yf | 15 | 23.6 |
| trans-1234ze | 10 | 59.0 |

TABLE 3-continued

| 1234yf OEL ppm ppm | Blend OEL ppm ppm | WCFF Blend OEL ppm ppm |
|---|---|---|
| 50 | 397 | 207 |
| 100 | 579 | 347 |

The data demonstrates that compositions A through G produce WCFF compositions during leakage that have OEL less than 400. Thus these compositions would be classified by ASHRAE as Class B, higher toxicity refrigerants.

Selected Embodiments

Embodiment A1

A composition consisting of (A) a refrigerant component consisting essentially of (1) at least one refrigerant having an OEL less than 400; and (2) a combination of refrigerants, each having an OEL greater than 400, consisting essentially of (i) HFC-32; and (ii) trans-HFO-1234ze; and optionally (B) a non-refrigerant component; wherein component (A)(2) of the refrigerant component is present in an amount sufficient to provide an overall OEL for the refrigerant component of at least 400.

Embodiment A2

The composition according to Embodiment A1 wherein the worst case fractionation formulation of the refrigerant component has an overall OEL of at least 400.

Embodiment A3

The composition of any of embodiments A1-A2 wherein the refrigerant component has a GWP of less than 500.

Embodiment A4

The composition of any of embodiments A1-A3 wherein component (A)(1) is selected from olefinic refrigerants.

Embodiment A5

The composition of any of Embodiments A1-A4 wherein component (A)(1) consists essentially of HFO-1234yf.

Embodiment A6

The composition of any of A1-A5 wherein the refrigerant component is suitable for, use as a replacement for R410A and consists essentially of from 3 to 12 weight percent of HFO-1234yf, from 70.5 to 74.5 weight percent of HFC-32, and from 15.5 to 24.5 weight percent of trans-HFO-1234ze.

Embodiment A7

The composition of any of A1-A5, wherein the refrigerant component is suitable for, use as a replacement for R410A and consists essentially of from 3 to 12 weight percent of HFO-1234yf, from 68 to 74.5 weight percent of HFC-32, and from 15.5 to 24.5 weight percent of trans-HFO-1234ze.

Embodiment A8

The composition of any of embodiments A1-A7 wherein component (A)(1) is selected from refrigerants which have an OEL of about 200 or less.

Embodiment A9

The composition of any of embodiments A1-A7 wherein component (A)(1) is selected from refrigerants which have an OEL of about 100 or less.

Embodiment A10

The composition of any of embodiments A1-A7 wherein component (A)(1) is selected from refrigerants which have an OEL of about 50 or less.

Embodiment B1

A method for replacing R410A in air conditioning or heat pump equipment including an evaporator designed for a refrigerant evaporation temperature between about −5° C. and about 20° C., comprising replacing said R410A with a composition of any of embodiments A1-A10.

Embodiment C1

A method for producing cooling in air conditioning or heat pump equipment suitable for using R410A as a refrigerant comprising producing cooling in said equipment using a composition of any of embodiments A1-A10 as a refrigerant.

Embodiment D1

A method for producing heating in heat pump equipment suitable for using R410A as a refrigerant comprising producing heating in said equipment using a composition of any of embodiments A1-A10 as a refrigerant.

Embodiment E1

An air conditioning or heat pump apparatus containing a refrigerant composition and suitable for using a refrigerant composition wherein R410A is the refrigerant component of said refrigerant composition, characterized by containing the refrigerant composition of any of embodiments A1-A10.

Embodiment F1

An air conditioning or heat pump apparatus containing a refrigerant composition and including an evaporator designed for a refrigerant evaporation temperature between about −5° C. and about 20° C. characterized by: containing the refrigerant composition of any of embodiments A1-A10.

Embodiment G1

A process for producing cooling comprising condensing a refrigerant component of a composition of any of embodiments A1-A10 and thereafter evaporating said refrigerant component in the vicinity of a body to be cooled.

Embodiment H1

A process for producing heating in heat pump equipment suitable for using R410A as a refrigerant comprising evaporating a refrigerant component of a composition of any of embodiments A1-A10 and thereafter condensing said refrigerant component in the vicinity of a body to be heated.

Embodiment I1

The composition of any of embodiments A1-A10, wherein the composition provides cooling capacity within 4% of that provided by R410A under the same cooling conditions.

Embodiment J1

The method of any of embodiments B1, C1 or D1, wherein the cooling or heating capacity achieved is within 4% of that when R410A is used as the refrigerant component of the composition.

Embodiment K1

The air conditioning or heat pump apparatus of any of embodiments E1 or F1, wherein the cooling or heating capacity of the apparatus is within 4% of that achieved when R410A is used as the refrigerant.

Embodiment K1

The process of any of embodiments G1 or H1, wherein the cooling or heating capacity achieved is within 4% of that when R410A is used as the refrigerant component.

Embodiment L1

Use of a composition of any of embodiments A1-A10 as a refrigerant in equipment suitable for use with R410A.

What is claimed is:

1. A composition consisting essentially of:
   (A) a refrigerant component, suitable for use as a replacement for R410A, consisting essentially of:
     (1) a refrigerant, having an OEL less than 400, consisting of from 3 to 12 weight percent of HFO-1234yf; and
     (2) a combination of refrigerants, each having an OEL greater than 400, consisting essentially of:
       (i) from 70.5 to 74.5 weight percent of HFC-32; and
       (ii) from 15.5 to 24.5 weight percent of trans-HFO-1234ze;
   and optionally
   (B) a non-refrigerant component;
   wherein component (A)(2) of the refrigerant component is present in an amount sufficient to provide an overall OEL for the refrigerant component of at least 400.

2. A method for replacing R410A in air conditioning or heat pump equipment including an evaporator designed for a refrigerant evaporation temperature between about −5° C. and about 20° C., comprising:
   replacing said R410A with a composition of claim 1.

3. A method for producing cooling in air conditioning or heat pump equipment suitable for using R410A as a refrigerant comprising:
   producing cooling in said equipment using a composition of claim 1 as a refrigerant.

4. A method for producing heating in heat pump equipment suitable for using R410A as a refrigerant comprising:
   producing heating in said equipment using a composition of claim 1 as a refrigerant.

5. An air conditioning or heat pump apparatus containing a refrigerant composition and suitable for using a refrigerant composition wherein R410A is the refrigerant component of said refrigerant composition, characterized by: containing the refrigerant composition of claim 1.

6. An air conditioning or heat pump apparatus containing a refrigerant composition and including an evaporator designed for a refrigerant evaporation temperature between about −5° C. and about 20° C. characterized by: containing the refrigerant composition of claim 1.

7. A composition consisting essentially of:
   (A) a refrigerant component, suitable for use as a replacement for R410A, consisting essentially of:
     (1) a refrigerant, having an OEL less than 400, consisting of from 3 to 12 weight percent of HFO-1234yf; and
     (2) a combination of refrigerants, each having an OEL greater than 400, consisting essentially of:
       (i) from 68 to 74.5 weight percent of HFC-32; and
       (ii) from 15.5 to 24.5 weight percent of trans-HFO-1234ze;
   and optionally
   (B) a non-refrigerant component;
   wherein component (A)(2) of the refrigerant component is present in an amount sufficient to provide an overall OEL for the refrigerant component of at least 400.

8. A method for replacing R410A in air conditioning or heat pump equipment including an evaporator designed for a refrigerant evaporation temperature between about −5° C. and about 20° C., comprising:
   replacing said R410A with a composition of claim 7.

9. A method for producing cooling in air conditioning or heat pump equipment suitable for using R410A as a refrigerant comprising:
   producing cooling in said equipment using a composition of claim 7 as a refrigerant.

10. A method for producing heating in heat pump equipment suitable for using R410A as a refrigerant comprising:
    producing heating in said equipment using a composition of claim 7 as a refrigerant.

11. An air conditioning or heat pump apparatus containing a refrigerant composition and including an evaporator designed for a refrigerant evaporation temperature between about −5° C. and about 20° C. characterized by: containing the refrigerant composition of claim 7.

* * * * *